United States Patent

Schaupert et al.

Patent Number: 6,155,711
Date of Patent: Dec. 5, 2000

[54] METHOD OF CALIBRATING TEMPERATURE-MEASURING RESISTORS ON A GLASS, GLASS-CERAMIC, OR SIMILAR SUBSTRATE

[75] Inventors: Kurt Schaupert, Hofheim; Harry Engelmann, Bingen, both of Germany

[73] Assignee: Schott Glas, Mainz, Germany

[21] Appl. No.: 08/906,570

[22] Filed: Aug. 5, 1997

[30] Foreign Application Priority Data

Aug. 9, 1996 [DE] Germany .................. 196 32 057

[51] Int. Cl.[7] ................ H01C 1/01; G01K 15/00
[52] U.S. Cl. ................ 374/1; 338/22 R; 338/25
[58] Field of Search .................. 338/22 R, 25; 431/328; 374/1; 219/464

[56] References Cited

U.S. PATENT DOCUMENTS

| | | | |
|---|---|---|---|
| 3,786,390 | 1/1974 | Kristen | 338/22 R |
| 4,237,368 | 12/1980 | Welch | 338/22 R |
| 4,840,494 | 6/1989 | Horn | 374/1 |
| 5,258,736 | 11/1993 | Kristen et al. | 338/22 R |

FOREIGN PATENT DOCUMENTS

| | | |
|---|---|---|
| 0 467 133 A2 | 1/1992 | European Pat. Off. . |
| 0 651 237 A1 | 5/1995 | European Pat. Off. . |
| 2 139 828 | 2/1974 | Germany . |
| 31 45 333 A1 | 5/1983 | Germany . |
| 4022845C2 | 1/1992 | Germany . |
| 4022844C1 | 2/1992 | Germany . |
| 4022846C2 | 8/1994 | Germany . |

*Primary Examiner*—G. Bradley Bennett
*Assistant Examiner*—Gail Verbitsky
*Attorney, Agent, or Firm*—Michael J. Striker

[57] ABSTRACT

The method of calibrating temperature-measuring resistors on substrates made of glass, glass-ceramics or similar materials, especially conductor strip resistors on glass-ceramic cooking surfaces, includes measuring a temperature associated with a measured resistance value obtained using the temperature-measuring resistor by determining a temperature-dependent electrical resistance of the substrate material, in order to obtain a temperature-resistance characteristic curve for the temperature-measuring resistor.

9 Claims, 2 Drawing Sheets

METHOD OF CALIBRATING TEMPERATURE-MEASURING RESISTORS ON A GLASS, GLASS-CERAMIC, OR SIMILAR SUBSTRATE

BACKGROUND OF THE INVENTION

The present invention relates to a method for calibrating temperature-measuring resistors on a glass, glass-ceramic or similar substrate, especially conductor strip resistors on a glass-ceramic cooking surface.

To improve the usability of cooking apparatus with a glass-ceramic cooking surface it is desirable to measure and indicate the temperature in the cooking zone or to control the cooking process using the temperature measurement. For example, conductor strips can be applied, for example, to the underside of the cooking surface in the vicinity of the cooking zone and utilize temperature-dependent resistors (temperature-measuring resistors) of conductive material. The method is useable for either an electrically heated or gas-heated cooking apparatus as well as, among others, a grill unit. Noble metals, such as gold or platinum, are used as the conductor strip material preferably at high operating temperatures. Also silver may be used with lower maximum temperatures (under 400° C.). This type of temperature measurement is described, for example, in German Patent Application DE 40 22 845 C2.

In general electric resistance increases approximately linearly with temperature in commonly used conductor strip materials and can be analyzed satisfactorily in the entire temperature range of interest with electronic means.

However it is disadvantageous that temperature-measuring resistors of the above-described type are subjected to aging in practical usage. Because of that the temperature-resistance characteristic curves of the temperature-measuring resistors can change to a considerable extent.

Typically the resistance of the temperature-measuring resistor changes by aging from 14 to 15 Ω at a temperature of 20° C. ($R_{20}$) at a standard operating temperature of about 600° C. during a standard operating time of about 2000 h. For example, the resistance of 14 Ω which previously corresponded to 20° C. is already measured at −8° C. because of the change of $R_{20}$ from 14 to 15 Ω. The resistance of 15.01 Ω which corresponded to a temperature of 50° C. previously is already measured at 20.3° C. and the resistance of 26.77 Ω which previously corresponded to a temperature of 400° C. is already reached at 347° C. At any rate, this corresponds to a deviation from a true reading of 29.7 to 53°. Also manufacturer's tolerances in the making of the conductor strip resistors lead to variations in the above-mentioned variable size.

SUMMARY OF THE INVENTION

It is an object of the present invention to provide a method of calibrating the above-described temperature-measuring resistors which takes into account the manufacture and/or aging related measurement errors.

According to the invention the method of calibrating the temperature-measuring resistors of a glass, glass-ceramic or similar substrate, especially conductor strip resistors on a glass-ceramic cooking surface, comprises measuring the temperature associated with at least one measured resistance value of a temperature-measuring resistor (i.e. temperature or temperatures at which the measured resistance value or values is or are obtained by the temperature-measuring resistor) by measuring the temperature-dependent electrical resistance of the substrate in order to determine a temperature-resistance characteristic curve for the temperature-dependent resistor.

The invention makes use of the fact that the electrical resistance of the substrate material is also suitable for temperature measurement with substrates made from glass, glass-ceramics or similar materials, in general at higher temperatures. "Comparable or similar materials" in the sense of the present invention means any material, which has comparable temperature-resistance chracteristic curves to glass or glass-ceramics. "Comparable materials" include, for example, ceramics and crystals, such as mica and quartz.

Subsequently the invention is illustrated without limitation by the example of a conductor strip resistor applied to a glass-ceramic cooking surface. The conductor strip resistor provides the temperature-measuring resistor. However the present invention is not only useable with conductor strip resistors on glass-ceramic cooking surfaces. Also other applications are of great interest. For example, temperature measurement (e.g. during a pyrolysis process) is especially desirable in other products with glass components, such as baking oven doors with glass windows. The internal temperature of a baking oven in a pyrolysis process is typically 500° C., which leads to a window temperature of up to 300° C., which is near the load limit of the window. By measurement or observation of the window temperature thermal destruction of the window can be avoided.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
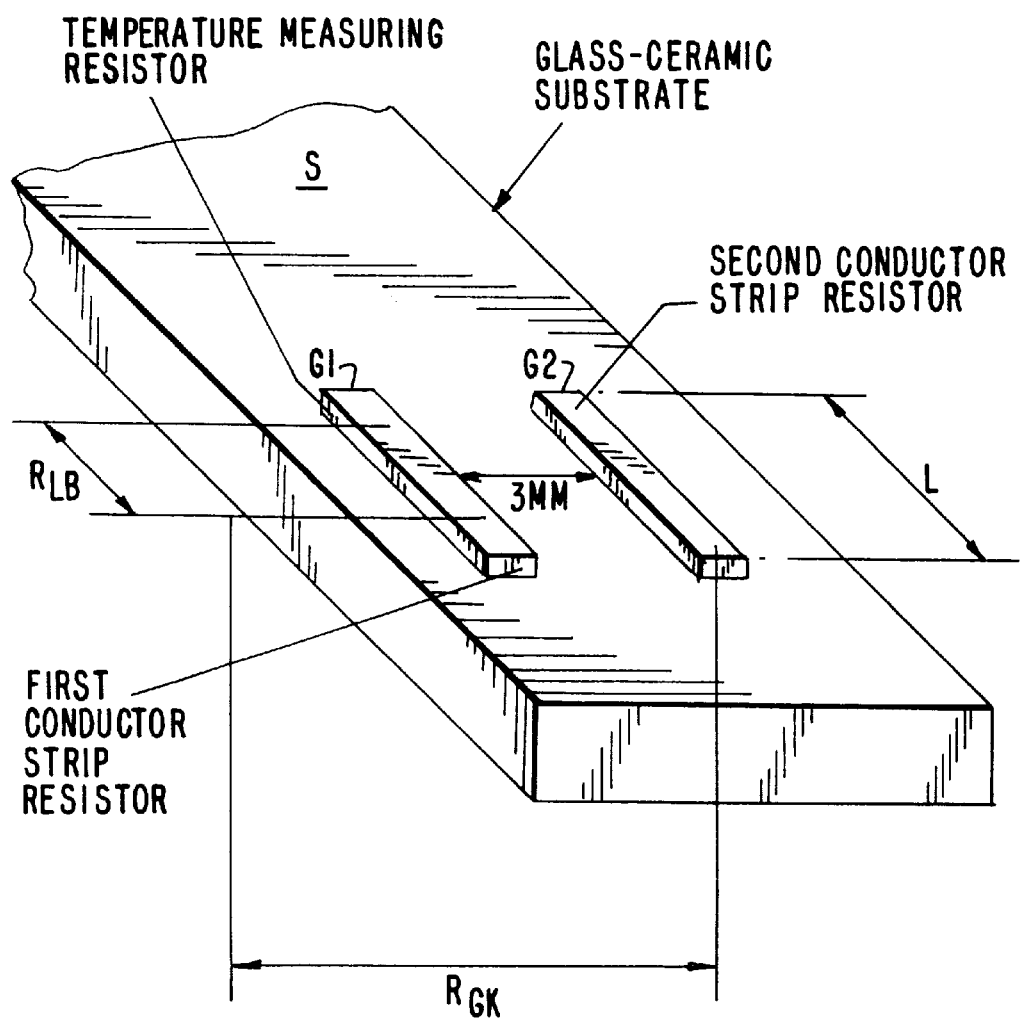
FIG. 1 is a perspective view showing a calibrating device for performing a first embodiment of a method of calibrating a temperature-measuring resistor according to the invention.

The use of a glass-ceramic temperature-measuring resistor for temperature measurement in a cooking apparatus with a glass-ceramic cooking surfaces is known and is described, for example in German Patent Applications DE 21 39 828 C and 40 22 846 C2. Usually conductor strips which border and contact a strip-like glass-ceramic temperature-measuring resistor arranged between them are applied parallel along a radius on an underside of the glass ceramic cooking surface in the vicinity of the cooking zone. Also other geometrical arrangements for this type of glass-ceramic temperature-measuring resistor are known already, for example, from German Patent Application DE 40 22 846 C2 and DE 40 22 844 C1.

The connection between the temperature $T_{GK}$ of the glass ceramic and the resistance $R_{GK}$ of the glass-ceramic sensor is given by the following equation (1):

$$T_{GK} = -B/(\lg(R_{GK}) + A) \tag{1},$$

wherein A and B are constants depending on the geometry of the sensor and the glass ceramic.

It is a disadvantage that the resistance of the glass-ceramic temperature-measuring resistor of the Prior Art increases exponentially with dropping temperature and is already so high at temperatures under 250° C. that it is no longer useable with conventional electronic means. Generally the electrical resistance of a glass ceramic or a glass is very stable in regard to changes due to aging in operation in contrast to conductor strip resistors. Also manufacturing-determined variations of resistance values are largely ignored. Typically the measurement error of the glass-ceramic temperature-measuring resistor is only about 3° with a glass-ceramic cooking surface with the above-described operating data (duration, temperature). The resistance of the glass-ceramic temperature-measuring resistor is thus outstanding as a reference variable for calibration of the conductor strip temperature-measuring resistor.

Thus according to the invention the temperature indicated by the conductor strip temperature-measuring resistor (aged or changed during manufacture) is calibrated with the temperature measured by the (largely stable) glass-ceramic temperature-measuring resistance, e.g. of a glass-ceramic substrate on which the conductor strip is mounted, as described in more detail hereinbelow.

The calibration is performed usually at temperatures between 250° C. and 600° C. Under temperatures of 250° C. the glass-ceramic temperature-measuring resistance cannot be processed or evaluated without more effort and the cooking apparatus operating range ends at 600° C. In principle the method is usable up to the load limit of the glass-ceramic of 750° C.

In the following the physical basis for the practical performance of the calibration method is described.

The relationship between the temperature $T_{LB}$ of the conductor strip and the resistance $R_{LB}$ of the conductor strip for a conductor strip material with a largely linear temperature-resistance characteristic curve, e.g., with gold or platinum, is given by an equation of the following form:

$$R_{LB}=R_{20}\cdot(1+\alpha_{20}(T_{LB}-20)) \quad (2)$$

and/or $$R_{20}=R_{LB}/(1+\alpha_{20}(T_{LB}-20)) \quad (3)$$

or $$T_{LB}=((R_{LB}-R_{20})/(R_{20}\cdot\alpha_{20})+20 \quad (4),$$

wherein $R_{20}$ is the resistance of the conductor strip at a reference temperature of 20° C. and $\alpha_{20}$ is the temperature coefficient of the resistance. These values are the values at 20° C., since the temperature coefficient of the resistance $\alpha_{20}$ is reported in the literature at 20° C. The above-described relationship is similar for other reference temperatures.

When the resistance is no longer linearly dependent on the temperature, the temperature-resistance characteristic curve is generally expressed with a polynomial of the form of equation (5):

$$R_{LB}=R_{20}\cdot(1+\alpha_{20}(T_{LB}-20)+\beta 20(T_{LB}-20)^2+\delta 20(T_{LB}-20)^3+\ldots) \quad (5)$$

In practical application $R_{20}$ and, with higher requirements $\alpha_{20}$ also (and, if necessary, $\beta_{20}$, and $\delta_{20}$, etc.) are subjected to the above-described variations because of aging of the conductor strip material and/or manufacturing-determined tolerances.

The temperature of the conductor strip is identical with the temperature of the adjoining glass-ceramic substrate: $T_{LB}=T_{GK}$. Thus in the calibration according to the invention at temperatures between 250° C. and 600° C. the temperature measured with the glass-ceramic sensor is assigned to the measured conductor strip resistance $R_{LB}$.

With sufficiently constant $\alpha_{20}$ the exact value $R_{20}$ can be determined from equation (3). An exact value of the temperature of the cooking zone is now determined from $R_{LB}$ over the entire interesting temperature range from room temperature to 600° C. with this corrected $R_{20}$.

In the event that the temperature coefficient of the resistance is not known with sufficient accuracy to meet the requirements, in an expansion of the above-described method calibration is performed with two temperatures above 250° C. A system of equations for $\alpha_{20}$ and $R_{20}$ is solved using the measured values.

The correction can take place when the temperature exceeds 250° C. or also only periodically in greater time intervals or with special operating conditions (e.g. operation of the cooking zone without vessels). The calibration can for example then be performed, when the variation of the temperature measurement based on the substrate material and that based on the conductor strip resistance amounts to more than 5° C. According to experience a calibration after about 10 operating hours suffices in order to guarantee sufficient measurement accuracy. Since the calibration can be performed in about 1 second, this produces no substantial hindrance to operation. The calibration during operation of the cooking zone without vessels has the advantaged that the heat transfer and thus the temperature profile of the cooking zone are accurately defined. This improves the accuracy of the calibration.

In the following the method according to the invention is illustrated with the help of an example:

Two gold conductor strips G1, G2 extending parallel to each other with a length/ of 180 mm and spaced apart about 3 mm on a glass-ceramic substrate S are used as temperature sensors. The electrical resistance $R_{LB}$ of one conductor strip G1 and the electrical resistance $R_{GK}$ of the glass-ceramic material of the substrate S between the conductor strips G1, G2 are measured as shown in the sole figure. Both values are correlated with the glass-ceramic temperature at a position on the glass ceramic determined with a separate temperature sensor (Pt 100).

Measured value pairs for the conductor strip resistance at about 600° C. were measured before and after an aging for 2000 hours and the associated temperature coefficients of the electrical resistance $\alpha_{20}$ were calculated:

|  | $T_{reference}$ | $R_{20}$ | $T_{LB}$ | $R_{LB}$ | $\alpha_{20}$ |
|---|---|---|---|---|---|
| New State | 20° C. | 14Ω | 400° C. | 26.77Ω | $2.4 \times 10^{-3}$/K |
| After Aging | 20° C. | 15Ω | 400° C. | 28.68Ω | $2.4 \times 10^{-3}$/K |

The calculated temperature coefficient $\alpha_{20}$ is specific for the measuring structure used and the associated temperature profile over the conductor strip length; it has proven itself largely stable during aging.

After aging the resistance of 26.77 Ω is reached already at a temperature of 347° C. according to equation (2). Without calibration the conductor strip sensor however would determine a temperature of 400° C.

According to the invention a temperature correction, e.g. to 400° C., can now be performed with a glass-ceramic sensor with an accuracy of ±3° C.

The new resistance value at the reference temperature of 20° C. of $R_{20}$=15 Ω±0.06 Ω with an accuracy according to equation (6) below with constant $\alpha_{20}$ and sufficiently accurate resistance measurement results from equation (3). Thus accordingly $T_{LB}=T_{GK}$ and $\Delta T_{LB} = \Delta T_{GK}$.

$$\Delta R_{20}=\pm|-R_{LB}\cdot\alpha_{20}/(1+\alpha_{20}\cdot T_{LB}-\alpha_{20}\cdot 20)^2|\cdot\Delta T_{LB} \quad (6)$$

The temperature can now be determined according to equation (4) with an accuracy according to equation (7) of $\Delta T_{LB}=\pm 1.8°$ C. with the help of a conductor strip resistance, e.g. $R_{LB}=16.08$ $\Omega$ at 50° C., with this new $R_{20}-\Delta R_{20}$.

$$\Delta T_{LB}=\pm|-R_{LB}/(\alpha_{20}\cdot R_{20}^2)|\cdot\Delta R_{20} \quad (7)$$

Without calibration after aging a temperature of 82° C. would be indicated instead of 50° C. corresponding to 16.08 $\Omega$ according to equation (4).

Figure 2:
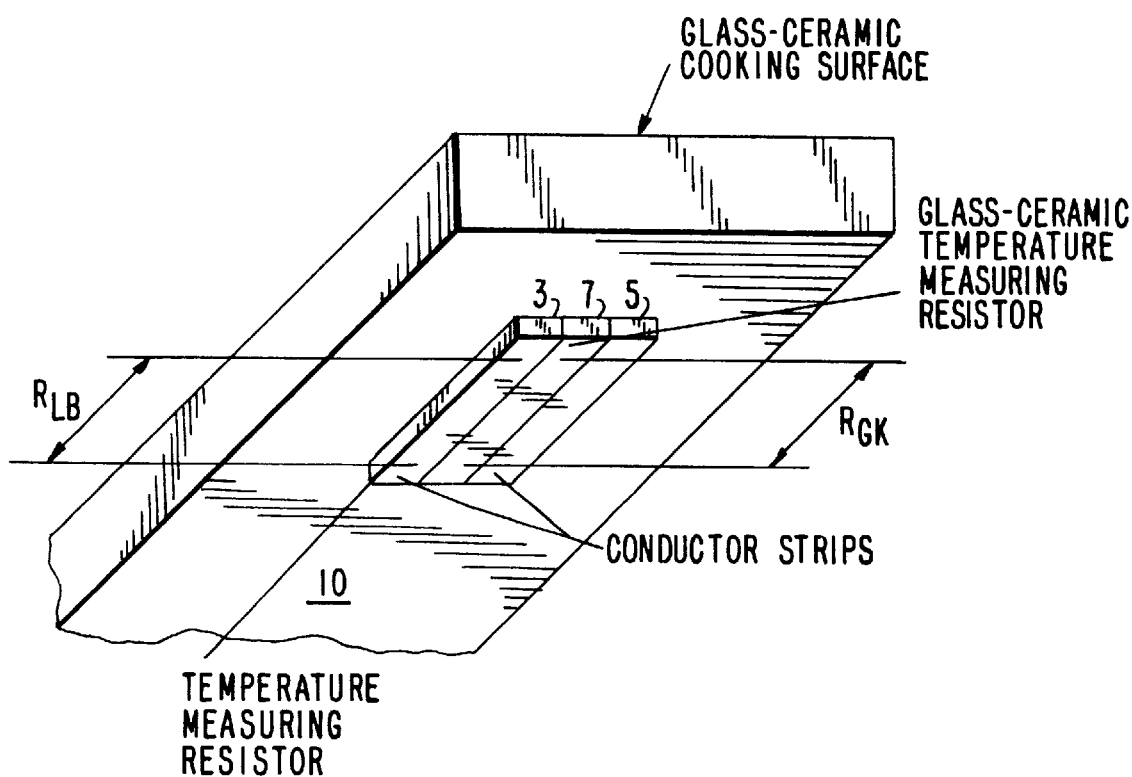
FIG. 2 is a bottom perspective view showing another calibrating device for performing a second embodiment of a method of calibrating a temperature-measuring resistor according to the invention.

The process according to the invention has the advantage that a very accurate temperature determination is possible over a long operating time with comparatively reduced structure. Thus, e.g., in the case of the glass-ceramic cooking surfaces in practice a conductor strip arrangement can be selected, as is known in the above-described prior art. It is only required to contact one of both parallel conductor strips 3,5 at both ends to determine the measured resistance of the conductor strip temperature-measuring resistor 3 as shown in FIG. 2. The strip-like glass-ceramic temperature-measuring resistor 7, which borders and contacts both conductor strips 3,5 and is used for determination of the actual temperature of the cooking surface 10, is located between both conductor strips.

The disclosure in German Patent Application 196 32 057.7-52 of Aug. 9, 1996 is incorporated here by reference. This German Patent Application describes the invention described hereinabove and claimed in the claims appended herein in below and provides the basis for a claim of priority for the instant invention under 35 U.S.C. 119.

While the invention has been illustrated and described as embodied in a method of calibrating temperature-measuring resistors on a glass, glass-ceramic or similar substrate, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of calibrating a temperature-measuring resistor applied to a substrate made of glass or glass-ceramic material, said temperature-measuring resistor consisting of a conductor strip resistor whose resistive properties change with time in operation, said method of calibrating said temperature-measuring resistor comprising the steps of:

a) measuring a resistance value of the temperature-dependent resistor to obtain a measured resistance value for the temperature-dependent resistor; and b) determining a temperature of the temperature-dependent resistor at which said measured resistance value was obtained during step a) by measuring a temperature-dependent electrical resistance of said substrate, whereby a temperature-resistance characteristic curve is obtained for the temperature-measuring resistor.

2. The method as defined in claim 1, wherein said conductor strip resistor is made of gold or platinum.

3. The method as defined in claim 1, wherein said temperature, at which the resistance value of the temperature-measuring resistor is measured, is determined at temperatures between 250° C. to 600° C. in order to perform the calibrating.

4. The method as defined in claim 1, wherein said temperature, at which the resistance value of the temperature-measuring resistor is measured, is determined in order to perform the calibrating when a deviation in a temperature value obtained with the temperature-measuring resistor from that obtained by said measuring of said electrical resistance of said substrate material is more than 5° C.

5. The method as defined in claim 1, wherein said substrate with said temperature-measuring resistor is mounted on a cooking surface of a cooking unit and said temperature, at which the resistance value of the temperature-measuring resistor is measured, is determined in order to perform the calibrating after operating said cooking unit for ten hours after manufacture of said cooking unit.

6. The method as defined in claim 1, wherein said temperature, at which the resistance value of the temperature-measuring resistor is measured, is determined in order to perform the calibrating by measuring the temperature-dependent electrical resistance of the substrate material directly bordering the temperature-dependent resistor.

7. The method as defined in claim 1, wherein said measuring of the resistance value of the temperature-measuring resistor and the measuring of the electrical resistance of the substrate occur at temperatures between 250° C. to 600° C. in order to perform the calibrating.

8. A method of calibrating a temperature-measuring resistor applied to a substrate made of glass or glass-ceramic material, said temperature-measuring resistor consisting of a first conductor strip resistor whose resistive properties change with time in operation, said method of calibrating said temperature-measuring resistor comprising the steps of:

a) applying a second conductor strip resistor to said substrate so that said second conductor strip is spaced from said first conductor strip resistor;

b) applying a glass-ceramic temperature-measuring resistor to the substrate between said first and second conductor strip resistors so as to contact both of said first and second conductor strip resistors;

c) measuring a resistance value of the temperature-measuring resistor to obtain a measured resistance value for the temperature-measuring resistor; and d) determining a temperature of the temperature-measuring resistor at which said measured resistance value was obtained during step c) by measuring a temperature-dependent electrical resistance of said glass-ceramic temperature-measuring resistor, whereby a temperature-resistance characteristic curve is obtained for the temperature-measuring resistor.

9. A method of calibrating a temperature-measuring resistor applied to a substrate made of glass or glass-ceramic material, said temperature-measuring resistor consisting of a conductor strip resistor whose resistive properties change with time in operation, said method of calibrating said temperature-measuring resistor comprising the steps of:

a) providing a mathematical equation expressing a linear relationship between resistance of the temperature-measuring resistor and temperature of the temperature-measuring resistor and including a number of temperature-independent parameters, wherein said mathematical equation is:

$$R_{LB} = R_{20} \cdot (1 + \alpha_{20}(T_{LB} - 20)),$$

and wherein said $R_{20}$ and $\alpha_{20}$ are said temperature-independent parameters, $R_{LB}$ is the resistance of the temperature-measuring resistor and $T_{LB}$ is the temperature of the temperature-measuring resistor;

b) measuring resistance values ($R_{LB}$) of said temperature-measuring resistor at two calibration temperatures ($T_{LB}$) above 250° C.;

c) determining each of said calibration temperatures ($T_{LB}$) from measured resistance values of said substrate at said calibration temperatures and a predetermined relationship between substrate resistance and substrate temperature in a temperature range above 250° C.;

d) inserting respective ones of said resistance values ($R_{LB}$) measured in step b) and corresponding ones of said calibration temperatures ($T_{LB}$) determined in step c) in said mathematical equation to obtain a system of equations for said temperature-independent parameters $R_{20}$ and $\alpha_{20}$; and e) solving said system of equations for said temperature-independent parameters $R_{20}$ and $\alpha_{20}$;

so that said temperature of the temperature-measuring resistor is obtained from said resistance of the temperature-measuring resistor under 250° C. by solving said mathematical equation with said resistance of the temperature-measuring resistor and said temperature-independent parameters obtained in step e) inserted in said mathematical equation.

* * * * *